US012363807B2

(12) United States Patent
O'Ryan et al.

(10) Patent No.: US 12,363,807 B2
(45) Date of Patent: Jul. 15, 2025

(54) PANE-LIKE ARTICLE AND ITS USE, AND HOUSEHOLD APPLIANCE COMPRISING THE SAME

(71) Applicant: SCHOTT AG, Mainz (DE)

(72) Inventors: Adam O'Ryan, Sweetwater, TN (US); Martin Letz, Mainz (DE); Martun Hovhannisyan, Heusenstamm (DE); Ioannis Neitzel, Bobingen (DE)

(73) Assignee: SCHOTT AG, Mainz (DE)

( * ) Notice: Subject to any disclaimer, the term of this patent is extended or adjusted under 35 U.S.C. 154(b) by 345 days.

(21) Appl. No.: 17/876,690

(22) Filed: Jul. 29, 2022

(65) Prior Publication Data

US 2022/0377857 A1 Nov. 24, 2022

Related U.S. Application Data

(63) Continuation of application No. PCT/EP2021/052096, filed on Jan. 29, 2021.

(60) Provisional application No. 62/968,198, filed on Jan. 31, 2020.

(51) Int. Cl.
*H05B 6/76* (2006.01)
*H05B 6/64* (2006.01)

(52) U.S. Cl.
CPC ........... *H05B 6/766* (2013.01); *H05B 6/6414* (2013.01); *H05B 6/6444* (2013.01)

(58) Field of Classification Search
CPC ..... H05B 6/6414; H05B 6/6444; H05B 6/766
USPC ....... 219/740, 699, 725, 729, 736, 737, 738, 219/739, 756
See application file for complete search history.

(56) References Cited

U.S. PATENT DOCUMENTS 5,470,423 A * 11/1995 Hawley ................. B29C 70/528 156/181

FOREIGN PATENT DOCUMENTS

| | | | | |
|---|---|---|---|---|
| DE | 102018123842 | A1 * | 4/2020 |
| EA | 017494 | B1 | 12/2012 |
| JP | 2002-327927 | | 11/2002 |
| JP | 2005268625 | A * | 9/2005 |
| JP | 2012-91407 | | 5/2012 |
| KR | 10-2004-0024859 | | 3/2004 |
| RU | 2436745 | C2 | 12/2011 |
| RU | 2439009 | C2 | 1/2012 |
| WO | 2017/163799 | | 9/2017 |

OTHER PUBLICATIONS

International Search Report and Written Opinion issued to International Application No. PCT/EP2021/052096, dated Mar. 30, 2022.

* cited by examiner

*Primary Examiner* — Quang T Van

(57) ABSTRACT

The present disclosure relates to pane-like articles, such as glass or glass ceramic substrates, suited for microwave-shielding applications, such as microwave oven doors or covers for electronic components. The present disclosure further relates to a household appliance comprising a pane-like article.

30 Claims, 2 Drawing Sheets

PANE-LIKE ARTICLE AND ITS USE, AND HOUSEHOLD APPLIANCE COMPRISING THE SAME

CROSS-REFERENCE TO RELATED APPLICATIONS

This is a continuation of International Patent Application No. PCT/EP2021/052096, filed Jan. 29, 2021, which claims priority to US Provisional Patent Application No. 62/968,198, filed Jan. 31, 2020, the entire contents of each of which hereby being incorporated by reference herein.

FIELD OF INVENTION

The present disclosure relates to pane-like articles, such as glass or glass ceramic panes or ribbons, suited for microwave-shielding applications, such as microwave oven doors or covers for electronic components. The present disclosure further relates to a household appliance comprising a pane-like article, as well as to uses of such pane-like articles.

BACKGROUND OF INVENTION

Pane-like articles used for shielding microwave radiation, like microwave oven doors, usually comprise a transparent glass pane as well as a metal mesh arranged adjacent to the glass pane. However, such a metal mesh obstructs the view through the glass pane.

In order to provide a clear view through the oven door while, at the same time, providing sufficient microwave shielding, different solutions have been proposed.

The microwave shielding layer of the prior art proposed solutions are composed of a metal mesh, or of coating layers comprising, i.a., indium tin oxide (ITO) fine particles, antimony-doped tin oxide (ATO) fine particles, aluminum-doped zinc oxide fine particles or materials among Ag, Cu, stainless steel, Ni, Cr, Ti, Au, carbon nanotube (CNT).

For instance, U.S. Pat. No. 2,920,174 teaches the issue of metallic thin films to reflect microwave radiation while transmitting optical radiation. The patent further teaches that the effective thickness of a metal thin film may be increased by metallizing opposed surfaces of a base member. Unfortunately, a microwave oven window utilizing inexpensive commercially available materials is not taught by the patent.

U.S. Pat. No. 5,981,927 teaches the use of an absorbing film together with a metal screen. The requirement for metal screen does not satisfactorily resolve the issue of transparency of the coated glass pane.

U.S. Pat. No. 8,502,125 B2 relates to a transparent conductive metal coating with holes on glass. The oven door includes at least one transparent door panel made of a dielectric material and a metallization enclosing at least partially the transparent door panel. The coating functions like a metal mesh. The composition of the metal coating is not given. A metal mesh is a screen with many holes having diameters less than the wavelength of the microwave radiation to prevent the transmission of microwave radiation to the exterior of the microwave oven. The coating according to U.S. Pat. No. 8,502,125 B2 comprises a conductive metal that is formed on a transparent substrate and has a plurality of holes with a diameter smaller than the wavelength of the microwaves. These holes in the otherwise opaque metallic coating allow to see through the door into the oven cavity, while at the same time the metallization imparts microwave shielding to the oven door.

U.S. Pat. No. 3,304,401 A discloses a laminated see-through microwave door closure in which a perforated metal core has its inner surface covered by a transparent unperforated layer and the outer surfaces covered by a transparent unperforated layer of plastic, Pyrex glass or the like. Such a perforated metal core, however, does not appear to meet the standard for the leakage of electromagnetic energy set forth, for example, in the Regulation for the Administration Enforcement of the Radiation Control for Health and Safety Act of 1968 in the United States.

To date, none of the proposed solutions solves the problem of ensuring a sufficient shielding of microwaves and/or a sufficient reflectance of electromagnetic radiation while at the same time providing a clear view through the pane-like article. Further, the proposed solutions require rather expensive productions processes.

OBJECT OF INVENTION

It therefore is an object of the present invention to provide pane-like articles for use in microwave shielding applications, like in a door or a window for a microwave oven or as a cover glass for a lighting device, that overcome the problems of the state of the art at least partially.

SUMMARY OF INVENTION

The object of the invention is solved by the subject-matter of the independent claims. Special and preferred embodiments are the subject of dependent claims and the further disclosure of this application.

The present disclosure relates to a pane-like article comprising a pane-like substrate and optionally a layer arranged on at least one of the principal surfaces of the substrate at least in a portion thereof, wherein the substrate comprises a glass or a glass ceramic material, and wherein in a portion of the pane-like article comprising the substrate and optionally the layer, the pane-like article has a reflectance of electromagnetic radiation in a wavelength range from 1.5 μm to 10 μm of about at least 10%, that is, spectral reflectance within this wavelength range is at least 10% over the entire wavelength range, and a microwave leakage of about less than 80 $mW/cm^2$, preferably less than 50 $mW/cm^2$, more preferably less 10 $mW/cm^2$, and most preferably less than 5 $mW/cm^2$.

According to an embodiment, microwave leakage may be less than about 70 $mW/cm^2$. According to an embodiment, microwave leakage may be less than about 60 $mW/cm^2$. According to an embodiment, microwave leakage may be less than about 50 $mW/cm^2$. According to an embodiment, microwave leakage may be less than about 40 $mW/cm^2$. According to an embodiment, microwave leakage may be less than about 30 $mW/cm^2$. According to an embodiment, microwave leakage may be less than about 20 $mW/cm^2$. According to an embodiment, microwave leakage may be more than about 10 $mW/cm^2$ and less than about 80 $mW/cm^2$, for example 70 $mW/cm^2$ or less, or 60 $mW/cm^2$ or less, or 50 $mW/cm^2$ or less, or 40 $mW/cm^2$ or less, or 30 $mW/cm^2$ or less, or 20 $mW/cm^2$ or less.

In the scope of the present disclosure, the microwave leakage is determined in a test conducted in accordance with or on the basis of Australian Standards AS NZS 60335.2.25 and AS/NZS 3760. Microwave leakage is determined for a frequency of about 2.45 GHz, which corresponds to a wavelength of 12.24 cm. The test is performed using a standard microwave leakage detector, the RF power sensing range is set between 0 $mW/cm^2$ to 100 $mW/cm^2$. However, the RF power sensing range may be also set between 0 $mW/cm^2$ and 80 $mW/cm^2$ or between 0 $mW/cm^2$ and 50 $mW/cm^2$, or else between 0 $mW/cm^2$ to 10 $mW/cm^2$, depending on the microwave leakage properties of the pane-like article. That is, in case a very good microwave leakage is achieved, the RF power sensing range may be set to smaller ranges, for example, between 0 $mW/cm^2$ and 10 $mW/cm^2$. Resolution is 0.1 $mW/cm^2$. Calibration accuracy is ±1 dB for a plane wave with circular polarization. Response to step input time is less than 1 second. After clearing stored information in a first step, a spacer is attached to the detector in order to ensure a correct measuring distance (in this case, 5 cm from the outer surface of the pane-like article to be tested). The detector further is adjusted so as to provide the highest readout, which will be recorded. Then, a cup of water, that is, approximately 275 ml of water, is placed inside a microwave oven equipped with a door comprising the pane-like article according to embodiments of the present disclosure. After closing the door, the microwave oven is started with a wattage of 800 watts. While operating of the microwave oven, the microwave leakage detector is run along the edges, seals and the outer surface of the door transparency in order to test for any leakage. This will lead to a measurement value on the digital display of the detector. These values need to be lower than 5 $mW/cm^2$ to pass the Australian standard.

The embodiments of the present disclosure can achieve a microwave leakage of about less than 80 $mW/cm^2$, preferably less than 50 $mW/cm^2$, more preferably less 10 $mW/cm^2$, and most preferably less than 5 $mW/cm^2$, at a wattage of at least 800 watts. The inventors believe that these microwave leakage values can also be achieved at a higher wattage, for example, 1,200 watts, or 2,000 watts, or even 3,000 watts.

Preferably, in all cases, microwave leakage is determined at a wattage of at least 800 watts. Inventors believe that microwave leakages as mentioned above may be achieved in a wattage range between at least 800 watts and at most 3,000 watts, or in a range between at least 800 watts and 2,000 watts, or in a range between at least 800 watts and 1,000 watts.

Further, in the scope of the present disclosure, Integrating Sphere device ET 100, of Surface Optics Corporation, has been used to measure the reflectance of electromagnetic radiation of the pane-like article in the wavelength range from 1.5 μm to 10 μm in five reflectance bands at two angles of incidence (20° and 60°). Wavelength filtered detectors measure the total nonvisible IR radiation reflected in each wavelength band. In the scope of the present disclosure, the terms IR reflection and IR reflectance are used as synonyms. Further, IR reflection (or IR reflectance) is preferably indicated for the wavelength range of electromagnetic radiation of 1.5 μm to 10 μm.

During measurement, the integrating sphere is pressed directly against the surface to be measured.

A pane-like article according to the disclosure offers several advantages.

For example, the pane-like article may be used as a clear viewing window for a microwave oven, in particular for embodiments with a microwave leakage of less than 10 $mW/cm^2$, preferably less than 5 $mW/cm^2$, with similar viewing quality as a traditional viewing window for a gas-powered oven.

A further advantage is that such an article can be utilized as a light diffuser, for example as part of a microwave oven door to provide uniform microwave oven cavity lighting without shadows that occur in the interior of the microwave oven when using a traditional metal mesh, or for example to cover the lighting unit that typically illuminates the interior of a microwave oven.

Further, such a pane-like article may also be used as a cover for a LED or for several LEDs. For example, in current microwaves light bulbs are replaced with LEDs. However, those LEDs can be damaged and need protection from microwave radiation above 80 $mW/cm^2$. In that case, the microwave leakage requirement for the articles of the current disclosure when used to cover LEDs may be set to be less than the microwave leakage requirement for the articles when used for microwave oven doors. The microwave leakage of the articles when used as protection for LEDs can be less than 80 $mW/cm^2$, preferably less than 50 $mW/cm^2$, more preferably less 10 $mW/cm^2$, and most preferably less than 5 $mW/cm^2$, however, and quite surprisingly, it has been found that a microwave leakage set at less than 80 $mW/cm^2$, preferably less than 50 $mW/cm^2$ is already sufficient to prevent affecting LED functionality at 900 Watt microwave power for 5 minutes. In each case, the microwave leakage is preferably determined at a wattage of at least 800 watts.

A dielectric glass or glass ceramic substrate, that is, a glass or glass ceramic substrate with a high dielectric constant and/or a low dielectric loss may be used to prevent microwave leakage in many higher wattage applications such as commercial or industrial microwaves. In the scope of the present invention, a glass or a glass ceramic material, having a high dielectric constant and/or a low dielectric loss is understood to refer to a glass or glass ceramic material with a dielectric constant, $\varepsilon_r$, at a frequency of 1 GHz of about at least 15 and preferably about at most 910, more preferably about at least 15 and below about 150, and/or a dielectric loss, tan δ, at a frequency of 1 GHz of about at most 0.0075 and preferably about at least 0.0024 and about at most 0.0075. For example, the glass or glass ceramic material may be present in form of a substrate, or as particle or particles, or as a layer, or as a flux.

Suitable compositions for the dielectric glass substrate, the dielectric flux, the dielectric particles and dielectric layers comprising a dielectric glass flux and/or dielectric particles can be essentially the same. That is, according to the disclosure, a dielectric glass or glass ceramic material is used in at least three different ways, that is, as a substrate and/or a flux and/or as particles.

Furthermore, the pane-like article may be used as electromagnetic shielding, especially for microwave blocking to prevent interference in sensitive areas or to create zones that hinder microwave radiation from entering or leaving a protected area. For example, such a shielding may be used to avoid, for example accidental triggering of explosive devices used in construction areas where blasting or rocks or other aggregates is required.

According to an embodiment, the layer is present and is a contiguous layer. In the scope of the present invention, a layer is understood as contiguous if it does not comprise any holes and/or recesses, but is applied continuously over the portion of the substrate to be covered by the layer.

According to an embodiment, the layer is present and is a substantially transparent uncoloured layer. In the scope of the present invention, a layer is regarded as an uncoloured layer if the layer has a neutral colour. A neutral colour can be defined by colour coordinates a*, b*, with $-2<a^*<2$ and $-2<b^*<2$, wherein a*, b* are colour coordinates in L*a*b* colour space. Here, L* is the lightness ranging from black (0) to white (100), a* from green to red, wherein positive values indicate a red colour and negative values a green colour and 0 is neutral, b* ranging from blue to yellow, wherein positive values indicate a yellow colour and negative values a blue colour and 0 is neutral.

According to a further embodiment, the pane-like substrate comprises a substantially transparent, uncoloured glass or glass ceramic material. Such an embodiment is preferred if a substantially clear, unobstructed view through the pane-like article is to be achieved. According to a preferred embodiment, a substantially transparent, uncoloured layer may be combined with a substantially transparent, uncoloured substrate. In such a way, a substantially clear, unobstructed view through the pane-like article is achieved.

According to a further embodiment, the layer is present and is an uncoloured coating, so that the colour difference ΔE between the colour of the article in a portion of the article that is layer-free, if such a layer-free portion exists, and the colour of the article in the portion comprising the substrate and the layer is less than 10, preferably less than 5, more preferably less than 3, wherein ΔE is the colour difference in CIEL*a*b* colour space and is given by the following equation $$\Delta E=\sqrt{((a_l^*-a_a^*)^2+(b_l^*-b_a^*)^2+(L_l^*-L_a^*)^2)}.$$

Here, indexes "l" denote the colour coordinates of the portion of the article comprising a layer and indexes "a" denote the colour coordinates of the portion of the article that is layer-free. Colour coordinates may be measured using, for example, a spectro-photometer CM-700d by Konica Minolta. The colour measurement in the portion of the article comprising the substrate and the layer is measured with the layer being on the side of the glass or glass ceramic article closest to the measuring device. Further, in case the substrate comprises an uncoloured, substantially transparent material, colour measurement is measured against a white background. In case no layer-free portion exists, in order to calculate the ΔE-value, an uncoated substrate may be used to obtain colour coordinates replacing the layer-free-colour coordinates.

"Glass" is, in the scope of the present disclosure, understood to refer to an amorphous material obtained by a melting process.

"Principal surfaces", in the scope of the present disclosure refers to these faces of the pane-like article that together make up most of the overall surface area of the glass or glass ceramic article. That is, the pane-like article according to an embodiment may be plate-like, such as a glass sheet or a cook-top panel or a microwave oven window. Then, the principal surfaces are the top side and the bottom side of the glass sheet or of the cook-top panel, respectively, or the front side and rear side of the microwave oven window when the microwave oven window is vertically installed in a microwave oven.

A "glass ceramic" is understood to mean a material obtained by subjecting a precursor glass material to a heat treatment usually comprising generating, during a first time period at a first temperature, small crystallites that are subsequently grown at a second temperature during a second time period. The process of controlled crystallization to produce a glass ceramic is well understood by the person skilled in the art.

In the scope of the present disclosure, the term "metal" refers to materials with at least predominantly metallic bonding at least in a bulk region thereof, in contrast to elements and/or materials named "metalloid" or "nonmetal". Metals may be so called metallic elements or compounds with at least predominantly metallic bonding. Such compounds may also be denoted alloys or metal alloys.

In the context of the present disclosure, a shaped body is considered as being pane-like if the dimension of the element in a first spatial direction of a Cartesian coordinate system is smaller by at least an order of magnitude than in the two other spatial directions of a Cartesian coordinate system. In other words, the thickness of a pane-like body is smaller by at least one order of magnitude than its width and length. Examples for pane-like articles comprising a pane-like substrate comprising a glass or glass ceramic material are, for example, glass or glass ceramic sheets or ribbons. A pane-like body may be flat or curved, like a curved or bent glass pane, for example.

According to an embodiment, the pane-like article and/or the substrate has a thickness of about 1 mm to about 8 mm. According to an embodiment, the thickness of the pane-like article and/or the substrate is about 1 mm. According to an embodiment, the thickness of the pane-like article and/or the substrate is about 2 mm, According to an embodiment, the thickness of the pane-like article and/or the substrate is about 3 mm. According to an embodiment, the thickness of the pane-like article and/or the substrate is about 4 mm. According to an embodiment, the thickness of the pane-like article and/or the substrate is about 5 mm. According to an embodiment, the thickness of the pane-like article and/or the substrate is about 6 mm. According to an embodiment, the thickness of the pane-like article and/or the substrate is about 7 mm. According to an embodiment, the thickness of the pane-like article and/or the substrate is about 8 mm.

According to an embodiment, the pane-like article has in the portion of the pane-like article comprising the substrate and optionally the layer a transmittance of electromagnetic radiation in a wavelength range from 380 nm to 780 nm (that is, a light transmittance) of about at least 10% for a thickness of the article and/or the substrate between about 3 mm and about 4 mm. According to a preferred embodiment, the light transmittance of electromagnetic radiation in a wavelength range from 380 nm to 780 nm in this portion of the article may be, for an article and/or substrate thickness between about 3 mm and about 4 mm, at least about 10%, or at least about 30%, or even as high as at least about 70% or even at least about 80%.

Light transmittance—or visible light transmittance—in the sense of the present disclosure is understood to refer to the light transmittance as defined in DIN EN 410. Light transmittance is determined for the wavelength range from 380 nm to 780 nm.

Here, the light transmittance has been determined as described below. The sample to be measured—in the present case the article comprising the substrate and optionally the layer—is placed outside of an integrating or Ulbricht sphere at a predetermined distance to the entrance of the sphere such that an aperture angle of 2° results. Said portion—in the present case, the portion of the article comprising the substrate and optionally the layer—is then irradiated with light according to standard illuminant D65. The light transmission may also be denoted as Y-value in the CIE-colour system measured with norm light C at an angle of 2°. The used light corresponds to white light with a colour temperature of 6800 K and thus represents day light. In the scope of the present invention, haze and visible light transmittance are determined using measurement device Hazeguard n1279 on the basis of or in accordance with ASTM D 1003 and ISO 13468.

According to an embodiment, the pane-like article has, in the portion of the pane-like article that comprises the substrate and, if present, the layer, an electrical resistivity of less than 50 ohm/$cm^2$, preferably of less than 30 ohms/$cm^2$.

According to an embodiment, the pane-like article has a thermal stability of at least 450° C. and preferably at most 620° C. In the scope of the present disclosure, an article is regarded as thermally stable up to or at a given temperature if the physical properties up to or at that temperature change only within a predetermined range. At temperatures higher than 620° C., irreversible changes to shape and/or structure may occur, like melting and/or deformation and/or distortion of the article and/or components comprised by the article, or crack formation, and/or discoloration. Such changes in shape and/or structure may not be detected in visual inspection, but may nevertheless result in detectable changes in physical properties, like electrical resistivity. It has been found that at temperatures higher than 620° C., glass deformation can occur. If a layer is present, undesirable changes to the layer may occur, too. Further, above 620° C., some loss of conductivity can occur which changes resistivity and therefore dielectric properties.

According to an embodiment, the article has, in the portion of the article comprising the substrate and, if present, the layer, a dielectric constant Cr of greater than about 15 at a frequency of 1 GHz. According to an embodiment, the dielectric constant Cr may be about at least 15 and less than about 910, preferably about at least 15 and less than about 150, at a frequency of 1 GHz.

According to an embodiment, the article has in the portion comprising the substrate and, if present the layer, a dielectric loss, tan $\delta$, of less than about 0.0075 at a frequency of 1 GHz. According to an embodiment, the dielectric loss, tan $\delta$, is more than about 0.0024 and less than 0.0075 at a frequency of 1 GHz.

According to a further embodiment, the article has in the portion comprising the substrate and, if present, the layer, a haze of about less than 150, preferably less than 100, and more preferably less than 1.8, for a pane-like article and/or substrate thickness of about 4 mm.

First Aspect

According to first aspect of the present disclosure, the substrate comprises a glass or glass ceramic material having a dielectric constant $\varepsilon_r$ of greater than 15 at a frequency of 1 GHz and/or a dielectric loss, tan $\delta$, of less than 0.0075 at a frequency of 1 GHz. According to an embodiment, the dielectric constant $\varepsilon_r$ may be greater than 15 and less than about 910, preferably greater than 15 and less than about 150, at a frequency of 1 GHz. According to an embodiment, the dielectric loss, tan $\delta$, is more than about 0.0024 and less than about 0.0075 at a frequency of 1 GHz. In this case, the substrate itself has a reflectance of electromagnetic radiation in a wavelength range from 1.5 μm to 10 μm of about at least 10%, and/or a microwave leakage of less than 80 mW/$cm^2$, preferably less than 50 mW/$cm^2$, more preferably less 10 mW/$cm^2$, and most preferably less than 5 mW/$cm^2$. The microwave leakage is preferably determined at a wattage of at least 800 watts. Further, the microwave leakage may preferably be achieved for substrate and/or article thicknesses between at least 1 mm and at most 8 mm. Such an embodiment is preferred in cases where a high transparency of the article is targeted because it is not necessary to apply any layer to the substrate. A further advantage of such an embodiment is that in this case, the article may be configured to show only very little haze, for example, of less than 1.8 for a thickness of the article of about 4 mm. Further, according to this aspect of the present disclosure, the article may comprise a layer of the present disclosure or a conventional layer only as a safety measure, in case a safety circuit for glass breakage is desired. According to a preferred embodiment, the article may be layer-free. Such an embodiment may be preferred if a high light transmittance is desired. Such an article may preferably be used as cover glass for microwave lighting devices as well as for a cavity viewing window, for example, a microwave oven door comprising a viewing window. The safety circuit may, in that case, be accomplished without a layer in order to detect glass breakage and, upon early detection of possible breakage, will de-energize the magnetron.

According to this first aspect, the substrate thickness is preferably at least 4 mm.

Suitable compositional ranges for glass materials for the dielectric substrate are given in the following table, in weight percent on an oxide basis:

TABLE 1

| Components | Range wt % | |
|---|---|---|
| $Nb_2O_5$ | 5-50 | preferably 9-40 |
| $P_2O_5$ | 0-45 | preferably 12-45 |
| $Li_2O$ | 0-4 | |
| $Na_2O$ | 0-4 | |
| BaO | 0-30 | preferably 17-25 |
| ZnO | 0-5 | |
| $TiO_2$ | 0-15 | |
| $ZrO_2$ | 0-10 | |
| $B_2O_3$ | 0-15 | |
| $Gd_2O_3$ | 0-15 | |
| $Y_2O_3$ | 0-5 | |
| $La_2O_3$ | 0-15 | |
| $GeO_2$ | 0-7 | |
| $Ta_2O_5$ | 0-7 | |
| $As_2O_3$ | 0-Less than 1 | |

An example composition of a suitable glass material for the dielectric substrate is given, in weight percent on an oxide basis, in the following table:

TABLE 2

| | 1 Wt.-% | 2 Wt.-% |
|---|---|---|
| Components | | |
| $SiO_2$ | | 6.5 |
| $P_2O_5$ | 37 | |
| $K_2O$ | 2.4 | |
| $Na_2O$ | | |
| BaO | 17 | |
| SrO | | |
| ZnO | 0.4 | |
| $TiO_2$ | 3.9 | 10.5 |
| $ZrO_2$ | | 6.4 |
| $Nb_2O_5$ | 39.3 | 9.5 |
| $B_2O_3$ | | 5.1 |
| $Gd_2O_3$ | | 7.6 |
| $Y_2O_3$ | | 0.5 |
| $La_2O_3$ | | 48.0 |
| $GeO_2$ | | 0.5 |
| $Ta_2O_5$ | | 6.0 |
| $As_2O_3$ | | 0.4 |
| Properties | | |
| Softening temperature EW ($10^{7.6}$ dPas) | 806° C. | 861° C. |
| Coefficient of thermal expansion (CTE) $\alpha_{(20-300)}$ | $6.8*10^{-6}$/K | $8.5*10^{-6}$/K |
| Density, g/$cm^3$ | 4.0 | 5.41 |
| Refractive index, $n_d$ | 1.92 | 2.022 |
| Dielectric constant, $\in_r$ | 21.2 @ 1 GHz | 19.9 @ 1 GHz |

TABLE 2-continued

| | 1 Wt.-% | 2 Wt.-% |
|---|---|---|
| Dielectric loss, tan δ | 0.0028 @ 1 GHz | 0.0042 @ 1 GHz |
| Haze | Less than 1.8 | Less than 1.8 |

Selected properties of the substrate have been listed in the above table as well. With respect to the indicated haze value, the haze measured for a substrate thickness of 4 mm is 1.76, for a substrate thickness of 1 mm is 1.19.

With a composition according to table 2, no. 1, for a substrate thickness of 4 mm, a microwave leakage of less than 80 mW/cm$^2$, for example 30-50 mW/cm$^2$, could be achieved. In contrast, a standard soda-lime glass substrate with a thickness of 4 mm resulted in a microwave leakage of more than 100 mW/cm$^2$. The microwave leakage is preferably determined at a wattage of at least 800 watts.

Further compositional ranges of suitable glass or glass ceramic materials are given in the following tables, in weight percent on an oxide basis:

TABLE 3

| Components | Range, wt % |
|---|---|
| $SiO_2$ | 0-30 |
| $P_2O_5$ | 0-50 |
| $Li_2O + Na_2O + K_2O$ | 0-15 |
| BaO + SrO + CaO + MgO | 0-80, preferably 16-40 |
| ZnO | 0-35 |
| $TiO_2$ | 0-85, preferably 3-39 |
| $ZrO_2$ | 0-75 |
| $Nb_2O_5$ | 0-60 |
| $B_2O_3$ | 0-20 |
| $GeO_2$ | 0-15 |
| $Gd_2O_3$ | 0-20 |
| $La_2O_3$ | 0-60 |
| $Y_2O_3$ | 0-5 |
| $WO_3$ | 0-15 |
| $Ta_2O_5$ | 0-25 |
| $As_2O_3$ | 0-less than 1 |
| $SnO_2$ | 0-less than 1 |
| F | 0-less than 2 |

TABLE 4

| Components | Range, wt % |
|---|---|
| $SiO_2$ | 0-50, preferably 0-30 |
| $P_2O_5$ | 0-50 |
| $Li_2O + Na_2O + K_2O$ | 0-15 |
| BaO + SrO + CaO + MgO | 0-30, preferably 0-18 |
| ZnO | 0-5 |
| $TiO_2$ | 3-17 |
| $ZrO_2$ | 0-8 |
| $Nb_2O_5$ | 8-60, preferably 8-40 |
| $B_2O_3$ | 0-20 |
| $GeO_2$ | 0-15 |
| $Gd_2O_3$ | 0-20 |
| $La_2O_3$ | 0-60, preferably 0-48 |
| $Y_2O_3$ | 0-5 |
| $WO_3$ | 0-15 |
| $Ta_2O_5$ | 0-25 |
| $As_2O_3$ | Less than 1 |
| $SnO_2$ | Less than 1 |
| F | Less than 2 |

According to this first aspect, a glass or glass ceramic with desirable dielectric properties is used as a substrate material. Suitable glass or glass ceramic materials have a dielectric constant, $\varepsilon_r$, at a frequency of 1 GHz of about at least 15 or between about 15 and about 910, preferably between about 15 and less than 150, and/or a dielectric loss, tan δ, at a frequency of 1 GHz of about at most 0.0075 or between about 0.0024 and about 0.0075. In the scope of the present invention, materials with these properties may also be called dielectric materials. That is, in the scope of the present invention, such a glass or glass ceramic may also be called a dielectric glass or glass ceramic.

If such a glass or glass ceramic substrate is used, it may provide a reflectance of electromagnetic radiation in a wavelength range from 1.5 μm to 10 μm of about at least 10%, and/or a microwave leakage of less than 80 mW/cm$^2$, preferably less than 50 mW/cm$^2$, more preferably less 10 mW/cm$^2$, and most preferably less than 5 mW/cm$^2$ due to these dielectric properties. That is, in case such a glass or glass ceramic substrate is used, no microwave blocking coating layer is needed. In case such a glass or glass ceramic substrate is used without any layer, it may further be contemplated using higher substrate thicknesses than 4 mm, for example, 6 mm or 8 mm. The microwave leakage is preferably determined at a wattage of at least 800 watts. Further, the microwave leakage may preferably be achieved for substrate and/or article thicknesses between at least 4 mm and at most 8 mm.

If the layer is present, for example to function in a safety circuit, it may be a metal layer, and the thickness of the layer may preferably be between 5 nm and 50 nm. According to an embodiment, the thickness may be between 5 nm and 30 nm. According to a further embodiment, the layer may be nanocrystalline, that is, comprising crystals with a size between 5 nm and 50 nm. For layer thicknesses of the metal layer of less than 5 nm, a non-uniform distribution of the layer materials could result, that is, for example, small clusters of metallic material might aggregate in some portions of the principal surface of the substrate, whereas other portions of said principal surface might remain cluster-free and, thus, layer-free. Such a non-uniform distribution might cause very high absorption of microwave energy in the clusters and therefore, a formation of hot spots, ultimately leading to a very high microwave leakage. However, the layer thickness should not be too high, either, in order to achieve a high visual transparency of the pane-like article.

The metal layer may comprise, given in weight percent, the following components:

TABLE 5

| Components | Range, wt % |
|---|---|
| Ni | 0-90 |
| Cr | 1-98, preferably 1-90 |
| Fe | 0-50 |
| C | More than 0, preferably less than or equal to 1.2 |
| Ti | 0-2.1 |
| Mo | 0-5 |
| Au | 0-5 |
| Cu | 0-10.5 |

Carbon is an unavoidable contaminant, not an intentionally added ingredient to the layer.

Suitable compositions of metal layers are given, in weight percent, in the following table:

TABLE 6

| | Metal layer no. | | | |
|---|---|---|---|---|
| Component | 1 (wt.-%) | 2 (wt.-%) | 3 (wt.-%) | 4 (wt.-%) |
| Ni | 10 | 1 | 90 | 0 |
| Cr | 88 | 97 | 2 | 98 |

TABLE 6-continued

| | Metal layer no. | | | |
|---|---|---|---|---|
| Component | 1 (wt.-%) | 2 (wt.-%) | 3 (wt.-%) | 4 (wt.-%) |
| C | 2 | 0.5 | 0.5 | 0.5 |
| Mo | | 1.5 | | |
| Cu | | | 7.5 | |
| Fe | | | | 1.5 |

In other words, the metal layer may be understood to be a metal alloy layer, the metal alloy, in this case, comprising at least 1 wt.-% of metallic chromium.

A metal alloy layer may be preferred over a layer comprising a single metal, as a metal alloy layer may show a better plasmon effect.

If the layer is present and is a metal layer, the metal layer may be a coating that may comprise at least 1 wt.-% of chromium. This may be necessary in order to achieve an improved transmittance for electromagnetic radiation in a wavelength range from 380 nm to 780 nm, that is, an improved light transmittance. Further, the microwave leakage of the article is, for such metal layers, found to be very low, that is, less than 5 mW/cm$^2$. However, a too high content of chromium of the metal layer may lead to the article having rather low light transmittance, for example lower than 5%. Therefore, the coating may comprise at most 98 wt.-% of chromium, preferably at most 90 wt.-% of chromium.

According to another embodiment, the layer is present and comprises a transparent conductive oxide (TCO).

In the scope of the present invention, transparent conductive oxides are understood to refer to semiconductor oxides that, when applied in the form of a thin film, show high light transmittance values of up to or even more than 80%. Transparent conductive oxide materials (or TCO materials) include, but are not limited to, tin oxides, especially doped tin oxides such as indium doped tin oxide, or zinc oxides, especially doped zinc oxides.

Preferably, the transparent conductive oxide comprises $SnO_2$. According to an embodiment, $SnO_2$ may be a main component of the transparent conductive oxide. According to a further embodiment, the TCO may comprise a doped $SnO_2$. In a doped material, such as doped $SnO_2$, the main component need not be present in its stoichiometric form. This may be indicated by substitution of the stoichiometric index "2" by "x" in the molecular formula. If, in the scope of the present disclosure, reference is made to a doped compound, like doped $SnO_2$, it is to be understood that in the structure of the stoichiometric compound, at least one dopant material, like Sb and/or Ni, substitutes for one of the main components, like Sn. If the doped material is a crystalline material, the dopant or dopants get incorporated in the crystal lattice. $SnO_2$ doped with element "Z" often is written as Z—$SnO_2$ or Z—$SnO_x$ or $SnO_2$:Z or $SnO_x$:Z. Suitable dopants include, but are not limited to, halogens, metalloids and transition metals and post transition metals and any combinations thereof, for example In, Ge, F, Cl, and I. A suitable compositional range of transparent conductive oxide materials comprising a doped $SnO_2$ is given in the following table:

TABLE 7

| Components | Range, wt % |
|---|---|
| $SnO_x$ | 90-99 |
| F | 0-10, preferably 1-10 |

TABLE 7-continued

| Components | Range, wt % |
|---|---|
| $SbO_y$ | 0-10, preferably 1-10 |
| $NiO_z$ | 0-10, preferably 1-10 |
| $CuO_a$ | 0-10, preferably 1-10 |

Here, the indices "a", "x", "y" and "z" in components $CuO_a$, $SnO_x$, $SbO_y$ and $NiO_z$ indicate that in the respective transparent conductive oxides, the oxides need not be present in their stoichiometric form, whereas the overall structure of the oxide, e.g. the crystal structure, remains at least substantially unaltered. Elements Cu, Sb and Ni substitute for Sn in the structure of compound $SnO_2$, whereas F may substitute for O. These components are present with mixed valences. For example, it may be noted that in the case of a doped $SnO_2$, usually not all Sn will have valence (+IV). Therefore, no exact numbers can be given for indices a, x, y, and z, respectively. Typically, dopant levels range from at least about wt.-1% to about not more than 2 wt.-%. However, good results may also be achieved if the dopant level exceeds 2 wt.-% and may be as high as 10 wt.-%.

Suitable compositions of transparent conductive oxide layers comprising $SnO_2$ as a main component are given in the following table, in weight percent:

TABLE 8

| | TCO composition no. | | |
|---|---|---|---|
| Component | 1 (wt.-%) | 2 (wt.-%) | 3 (wt.-%) |
| $SnO_x$ | 97 | 90 | 94 |
| F | 3 | | |
| $NiO_y$ | | 10 | |
| $SbO_z$ | | | 6 |

In case the article comprises a TCO layer, this layer may provide a low electrical resistivity of about less than 1,000 ohm/cm$^2$. Such a layer shows electrical conductivity only under applied field, which makes it ideal to work as a safety circuit. The layers comprising TCO materials, especially comprising $SnO_2$, may preferably be applied via atmospheric pressure chemical vapour deposition (APCVD). The TCO comprising layer may be used as part of the safety circuit of a microwave device, such as, for example, a household appliance, e.g. a microwave oven. Such a safety circuit is in series with the overall safety switches of the device and may be used to detect glass breakage. In this case, the TCO layer may be provided in form of a very thin layer that would, if taken as a single layer that provides no microwave-shielding properties on a glass substrate, have a microwave leakage higher than 10 mW/cm$^2$. However, if such a thin TCO comprising layer is combined with a metal layer, the otherwise not sufficient microwave shielding properties of the TCO comprising layer do not affect the primary leakage blocking that is accomplished by the metal layer or the dielectric glass or glass ceramic substrate.

Applying a layer comprising a transparent conductive oxide material is preferably achieved by a pyrolytic process such as APCVD. In the scope of the present disclosure, a pyrolytic process is understood as a thermal coating process involving the reaction of precursor materials at elevated temperatures. In this way, thermally applied (or pyrolytic) coatings may be obtained. These coatings usually are hard coatings that are chemically bonded to the substrate, in contrast to soft coatings that form at least predominantly mechanical bonds.

It may be preferred that the article comprises two layers, wherein one of the layers is a metal layer and the other layer comprises a transparent conductive oxide.

According to an embodiment, the article comprises a substrate and a layer and the layer comprises a glass or glass ceramic material having a dielectric constant $\varepsilon_r$ of greater than about 15 and preferably less than about 910, preferably about at least 15 and below about 150, at a frequency of 1 GHz and/or a dielectric loss, tan δ, of less than about 0.0075 and preferably more than about 0.0024 and less than about 0.0075 at a frequency of 1 GHz. In that case, the layer is configured so that it also exhibits microwave shielding properties.

Such an embodiment may be particularly preferred if a high thermal stability of the article is to be achieved, as in that case, substrate materials with a high glass transition temperature and/or a low coefficient of thermal expansion may be used. A further advantage of this embodiment is that according to this embodiment, the layer may be configured as a glass-based or enamel layer. This allows for suitable production processes such as screen printing. Such a printing process allows to apply the layer only onto a selected portion of one of the principal surfaces of the pane-like substrate without the need of further masking processes or equipment.

Second Aspect

According to a second aspect of the present disclosure, the article comprises a dielectric or non-dielectric substrate and a layer and the layer comprises a glass or glass ceramic material, wherein the layer, preferably a non-dielectric glass flux layer, comprises dielectric particles, preferably dielectric glass particles. In this embodiment, desirable properties may be provided by the dielectric particles present in the glass flux layer, so it is unnecessary for the substrate or the remainder of the glass flux layer (when measured without the dielectric particles) to have dielectric properties, in other words the substrate and the glass flux layer (when measured without the dielectric particles) may have a dielectric constant, $\varepsilon_r$, of less than about 15 and/or a dielectric loss, tan δ, of more than about 0.0075. In the scope of the present invention, such a glass material will be called a non-dielectric glass material, e.g. a non-dielectric glass flux or a non-dielectric glass substrate.

Further, according to this second aspect, a dielectric glass or glass ceramic material will be understood as a glass or glass ceramic material, in particular, glass or glass ceramic particles, with a high dielectric constant and/or a low dielectric loss, which is understood to refer to glass or glass ceramic materials, for example, to glass or glass ceramic or dielectric particles, with a dielectric constant, $\varepsilon_r$, at a frequency of 1 GHz of about at least 15 and preferably about at most 910, more preferably below 150, and/or a dielectric loss, tan δ, at a frequency of 1 GHz of about at most 0.0075 and preferably about at least 0.0024.

According to the second aspect, high layer thicknesses of at least 4 mm, preferably of more than 4 mm, of the layer comprising a glass or glass ceramic material are mandatory if not further layers are present. Such high layer thicknesses of the layer comprising the glass or glass ceramic material may be achieved by screen printing or by roller coating. Whereas applying a single layer of such a high thickness cannot be applied in a single screen printing process so that several successive printing steps are necessary in order to obtain such high thicknesses are mandatory, by roller coating a high thickness of 4 mm or more may be obtained in a single process step. However, according to an embodiment, the layer comprising a dielectric glass or glass ceramic material may be applied in a roller coating process, wherein several successive roller coating steps are conducted.

Further, after application of the layer or the successively applied layers, surface polishing may be accomplished, preferably after firing.

According to an embodiment, the layer comprises a non-dielectric flux and dielectric particles.

According to the second aspect of the present disclosure, the layer may comprise a non-dielectric glass flux having dielectric glass particles, wherein the non-dielectric glass flux may comprise, in weight percent on an oxide basis, the following components:

TABLE 9

| Components | Range, wt % |
|---|---|
| $SiO_2$ | 20-70 |
| $Al_2O_3$ | 0-20 |
| $B_2O_3$ | 0-30 |
| $Li_2O + Na_2O + K_2O$ | 0-30, preferably 3-25 |
| MgO + CaO + SrO + BaO | 0-25, preferably 0-15 |
| ZnO | 0-35 |
| $TiO_2 + ZrO_2$ | 0-10 |
| $Bi_2O_3$ | 0-65 |
| F | 0-3 |
| Cl | Less than 0.5 |
| $Re_2O_3$ (Re═$La^{3+}$, $Ce^{3+}$, $Y^{3+}$) | Less than 0.5 |
| $SnO_2$ | Less than 0.5 |
| $SO_3$ | Less than 0.5 |
| $Fe_2O_3$ | Less than 0.5 |
| $P_2O_5$ | Less than 0.5 |

In that case, the non-dielectric glass flux is configured so as not to impart a reflectance of electromagnetic radiation or microwave leakage prevention. However, in some embodiments, the layer may comprise a further glass component, such as glass particles, wherein the glass particles have a dielectric constant, $\varepsilon_r$, of greater than about 15 and preferably less than about 910, preferably about at least 15 and below about 150, at a frequency of 1 GHz and/or a dielectric loss, tan δ, of less than about 0.0075 and preferably more than about 0.0024 and less than about 0.0075 at a frequency of 1 GHz. Such an embodiment may be preferred, as according to this embodiment the non-dielectric glass flux may be selected so as to provide a specific softening temperature or a coefficient of thermal expansion (CTE, thermal expansion coefficient) that very closely matches the CTE of a given substrate and the dielectric particles may provide the electromagnetic radiation reflection and microwave leakage properties of the current invention.

Softening temperatures (the softening temperature is the temperature at which the glass has a viscosity of $10^{7.6}$ dPas) of the glass flux materials according to the compositional ranges as given above, may be between about 540° C. and about 760° C. Density may be as low as 2.3 g/cm$^3$ and as high as 5 g/cm$^3$. The CTE may range from about $4.0*10^{-6}$/K to about $11*10^{-6}$/K. The haze of the article and/or the coatings (or layers) thus obtained may vary in a wide range, but are typically below a value of 150, preferably below 100.

The compositions (given in weight percent on an oxide basis) as well as selected properties of suitable non-dielectric glass fluxes according to this embodiment are given in the following table:

TABLE 10

| [wt-%] | 1 (wt.-%) | 2 (wt.-%) | 3 (wt.-%) | 4 (wt.-%) | 5 (wt.-%) |
|---|---|---|---|---|---|
| | Flux no. | | | | |
| Component | | | | | |
| $Al_2O_3$ | 3.3 | 5.0 | 1.0 | 16.6 | 5.9 |
| $B_2O_3$ | 7.2 | 18.0 | 13.1 | 16.7 | 23.1 |
| $Bi_2O_3$ | 64.0 | | | | 9.4 |
| BaO | | | | | |
| CaO | 0.2 | 3.0 | 0.9 | 2.0 | |
| SrO | | | | 2.3 | |
| $Fe_2O_3$ | | | | | |
| $K_2O$ | 0.5 | | | | |
| $Li_2O$ | 3.3 | 4.0 | | 3.1 | 4.4 |
| $La_2O_3$ | | | | | |
| MgO | 0.1 | 1.0 | | 1.7 | |
| $Na_2O$ | | 10.0 | 18.8 | | 0.2 |
| $P_2O_5$ | | | | | |
| $SiO_2$ | 21.2 | 50.0 | 50.9 | 54.3 | 57.0 |
| $SO_3$ | | | | | |
| $TiO_2$ | 0.1 | 6.3 | 6.3 | | |
| $SnO_2$ | | | | | |
| ZnO | 0.1 | 8.0 | 8.5 | 2.2 | |
| $ZrO_2$ | 2.0 | 0.5 | 0.5 | 1.1 | |
| Properties | | | | | |
| Softening temperature EW ($10^{7.6}$ dPas) | 548 | 594 | 644 | 755 | 698 |
| Coefficient of thermal expansion (CTE) $\alpha_{(20-300)}$ | 7.3 | 8.6 | 9.7 | 4.4 | 4.8 |
| Density, g/cm$^3$ | 4.52 | 2.48 | 2.69 | 2.41 | 2.43 |

The dielectric glass particles may comprise glass particles with a dielectric constant, $\varepsilon_r$, of greater than about 15 and preferably less than about 910, preferably about at least 15 and below about 150, at a frequency of 1 GHz and/or a dielectric loss, tan δ, of less than about 0.0075 and preferably more than about 0.0024 and less than about 0.0075 at a frequency of 1 GHz.

Preferably, in that case, the glass or glass ceramic particles may comprise the following components, given in weight percent on an oxide basis:

TABLE 11

| Components | Range, wt % |
|---|---|
| $SiO_2$ | 0-30 |
| $P_2O_5$ | 0-50 |
| $Li_2O + Na_2O + K_2O$ | 0-15 |
| BaO + SrO + CaO + MgO | 0-80, preferably 16-40 |
| ZnO | 0-35 |
| $TiO_2$ | 0-85, preferably 3-39 |
| $ZrO_2$ | 0-75 |
| $Nb_2O_5$ | 0-60 |
| $B_2O_3$ | 0-20 |
| $GeO_2$ | 0-15 |
| $Gd_2O_3$ | 0-20 |
| $La_2O_3$ | 0-60 |
| $Y_2O_3$ | 0-5 |
| $WO_3$ | 0-15 |
| $Ta_2O_5$ | 0-25 |
| $As_2O_3$ | 0-less than 1 |
| $SnO_2$ | 0-less than 1 |
| F | 0-less than 2 |

A further compositional range for glass or glass ceramic particles is given in the following table in weight percent on an oxide basis:

TABLE 12

| Components | Range, wt % |
|---|---|
| $SiO_2$ | 0-50, preferably 0-30 |
| $P_2O_5$ | 0-50 |
| $Li_2O + Na_2O + K_2O$ | 0-15 |
| BaO + SrO + CaO + MgO | 0-30, preferably 0-18 |
| ZnO | 0-5 |
| $TiO_2$ | 3-17 |
| $ZrO_2$ | 0-8 |
| $Nb_2O_5$ | 8-60, preferably 8-40 |
| $B_2O_3$ | 0-20 |
| $GeO_2$ | 0-15 |
| $Gd_2O_3$ | 0-20 |
| $La_2O_3$ | 0-60, preferably 0-48 |
| $Y_2O_3$ | 0-5 |
| $WO_3$ | 0-15 |
| $Ta_2O_5$ | 0-25 |
| $As_2O_3$ | Less than 1 |
| $SnO_2$ | Less than 1 |
| F | Less than 2 |

Softening temperatures (that is, the temperature at which the glass has a viscosity of $10^{7.6}$ dPas) of the glass materials according to the compositional ranges as given above, may be between about 540° C. and about 760° C. Density may be as low as 2.3 g/cm$^3$ and as high as 5 g/cm$^3$. The CTE may range from about $4.0*10^{-6}$/K to about $10*10^{-6}$/K. The haze of the article and/or the coatings thus obtained may vary in a wide range, but is typically below a value of 150. The dielectric constant Cr of the glass or glass ceramic at a frequency of 1 GHz of greater than about 15, whereas the dielectric loss, tan δ, is less than 0.0075 at a frequency of 1 GHz and preferably about at least 0.0024 and about at most 0.0075.

The following table lists suitable compositions for the dielectric glass substrate, the dielectric flux and the dielectric particles (given in weight percent on an oxide basis) as well as selected properties of dielectric glasses, glass ceramics or ceramics:

TABLE 13

| | 1 (wt.-%) | 2 (wt.-%) | 3 (wt.-%) | 4 (wt.-%) |
|---|---|---|---|---|
| | Particle no. | | | |
| Components | | | | |
| $SiO_2$ | | 3.6 | | 10.14 |
| $Al_2O_3$ | | 9.2 | | 6.46 |
| $B_2O_3$ | | | | 0.93 |
| $P_2O_5$ | 37 | | | |
| $K_2O$ | 2.4 | | | |
| $Na_2O$ | | | | |

TABLE 13-continued

| | Particle no. | | | |
|---|---|---|---|---|
| | 1 (wt.-%) | 2 (wt.-%) | 3 (wt.-%) | 4 (wt.-%) |
| BaO | 17 | 34.2 | 36.8 | 54.01 |
| SrO | | | 24.9 | |
| CaO | | | | 1.08 |
| ZnO | 0.4 | | | |
| $TiO_2$ | 3.9 | 37.9 | 38.3 | 27.38 |
| $ZrO_2$ | | 8.7 | | |
| $Nb_2O_5$ | 39.3 | | | |
| $B_2O_3$ | | | | |
| $Gd_2O_3$ | | | | |
| $La_2O_3$ | | 6.1 | | |
| $GeO_2$ | | | | |
| $Ta_2O_5$ | | | | |
| $As_2O_3$ | | | | |
| Properties | | | | |
| Softening temperature EW ($10^{7.6}$ dPas) | 806° C. | 822° C. | More than 900° C. | 773° C. |
| Coefficient of thermal expansion (CTE) $\alpha_{(20-300)}$ | 6.8 | 8.8 | More than 8 | 10 |
| Density, g/cm$^3$ | 4.0 | 4.39 | 4.91 | 4.27 |
| Refractive index, $n_d$ | 1.92 | 2.03 | 2.02 | 1.78 |
| Dielectric constant, $\epsilon_r$ | 21.1 @ 1 GHz | 33.2 @ 1 GHz | 896 @ 1 GHz | More than 40 @ 1 GHz |
| Dielectric loss, tan δ | 0.0028 @ 1 GHz | 0.00055 @ 1 GHz | 0.0024 @ 1 GHz | More than 0.002 @ 1 GHz |
| Haze (for substrate and/or article thickness of 4 mm) | Less than 1.8 | Less than 1.8 | More than 100 | Less than 2.0 |

Preferably, the article in all aspects of the invention may comprise a further layer, wherein the further layer is a metal layer. This further layer may be arranged between the substrate and the first layer, thus forming a base coat, or the further layer may be arranged on top of the first layer as a top coat. The further layer may be, in this case, configured to provide a safety circuit in case the article is used in a microwave oven, for example. Compositional ranges of suitable metal or metal alloy layers are listed in Table 5. Examples of metal or metal layers are listed in Table 6.

The further layer may also be configured to comprise a transparent conductive oxide described above.

Further, the article according to all aspects of the disclosure may also comprise several further layers.

In case a further layer is present, the layer comprising a glass or glass ceramic material may have a thickness of less than 4 mm.

Third Aspect

According to a third aspect of the present disclosure, the article comprises a dielectric or non-dielectric substrate and a layer and the layer comprises a glass or glass ceramic material, wherein the layer is a dielectric glass flux layer that may comprise particles. According to an embodiment, the layer may comprise non-dielectric particles. In this embodiment, desirable properties, such as desirable dielectric properties, may be provided by the dielectric glass flux layer, so it is unnecessary for the substrate or the optionally present particles in the glass flux layer to have dielectric properties, in other words the substrate and the optionally present particles may have a dielectric constant, $\varepsilon_r$, of less than about 15 and/or a dielectric loss, tan δ, of more than about 0.0075. According to an embodiment, the layer may comprise dielectric particles. According to an embodiment, the flux may be a partially crystallizing flux, so that after firing, the layer may comprise crystal particles resulting from partial crystallization of the glass flux. According to an embodiment, the layer may be a "flux only" layer, that is, only a glass or glass ceramic flux material is applied to the substrate and fired afterwards.

Further, according to this third aspect, a dielectric glass or glass ceramic material will be understood as a glass or glass ceramic material, in particular, glass or glass ceramic particles or glass or glass ceramic fluxes, with a high dielectric constant and/or a low dielectric loss, which is understood to refer to glass or glass ceramic materials, for example, to glass or glass ceramic or dielectric particles or fluxes, with a dielectric constant, $\varepsilon_r$, at a frequency of 1 GHz of about at least 15 and preferably about at most 910, more preferably below 150, and/or a dielectric loss, tan δ, at a frequency of 1 GHz of about at most 0.0075 and preferably about at least 0.0024.

According to the third aspect, high layer thicknesses of at least 4 mm, preferably of more than 4 mm, of the layer comprising a glass or glass ceramic material are mandatory if no further layers are present. Such high layer thicknesses of the layer comprising the glass or glass ceramic material may be achieved by screen printing or by roller coating. Whereas applying a single layer of such a high thickness cannot be applied in a single screen printing process so that several successive printing steps are necessary in order to obtain such high thicknesses are mandatory, by roller coating a high thickness of 4 mm or more may be obtained in a single process step. However, according to an embodiment, the layer comprising a dielectric glass or glass ceramic material may be applied in a roller coating process, wherein several successive roller coating steps are conducted.

According to an embodiment, the glass flux may be a crystallizing or at least partially crystallizing glass flux or comprise a glass that is at least partially crystallisable. Such a glass flux may also be denoted, in the scope of the present disclosure, a glass ceramic flux.

In the scope of the present disclosure, the terms "glass flux" and "glass frit" are used synonymously. In the scope of the present disclosure, a glass flux is understood to refer to a glassy material with a low softening point, that is, a softening point between at least about 350° C. and at most about 750° C.

According to an embodiment, the layer comprises a dielectric flux and non-dielectric particles.

According to an embodiment, the glass flux comprises a glass material having a dielectric constant, Cr, of greater than about 15 and preferably less than about 910, more preferably about at least 15 and below 150, most preferably at least about 15 and below about 35, at a frequency of 1 GHz and/or a dielectric loss, tan δ, of less than about 0.0075 and preferably more than about 0.0024 and less than about 0.0075 at a frequency of 1 GHz. The dielectric glass flux may comprise the following components, given in weight percent on an oxide basis:

TABLE 14

| Components | Range, wt % |
|---|---|
| $SiO_2$ | 0-50, preferably 0-30 |
| $P_2O_5$ | 0-50 |
| $Li_2O + Na_2O + K_2O$ | 0-15 |
| BaO + SrO + CaO + MgO | 0-30, preferably 0-18 |
| ZnO | 0-5 |
| $TiO_2$ | 3-17 |
| $ZrO_2$ | 0-8 |
| $Nb_2O_5$ | 8-60, preferably 8-40 |
| $B_2O_3$ | 0-20 |
| $GeO_2$ | 0-15 |
| $Gd_2O_3$ | 0-20 |
| $La_2O_3$ | 0-60, preferably 0-48 |
| $Y_2O_3$ | 0-5 |
| $WO_3$ | 0-15 |
| $Ta_2O_5$ | 0-25 |
| $As_2O_3$ | Less than 1 |
| $SnO_2$ | Less than 1 |
| F | Less than 2 |

A further compositional range for the dielectric glass flux is given in weight percent on an oxide basis in the following table.

TABLE 15

| Components | Range, wt % |
|---|---|
| $SiO_2$ | 0-30 |
| $P_2O_5$ | 0-50 |
| $Li_2O + Na_2O + K_2O$ | 0-15 |
| BaO + SrO + CaO + MgO | 0-80, preferably 16-40 |
| ZnO | 0-35 |
| $TiO_2$ | 0-85, preferably 3-39 |
| $ZrO_2$ | 0-75 |
| $Nb_2O_5$ | 0-60 |
| $B_2O_3$ | 0-20 |
| $GeO_2$ | 0-15 |
| $Gd_2O_3$ | 0-20 |
| $La_2O_3$ | 0-60 |
| $Y_2O_3$ | 0-5 |
| $WO_3$ | 0-15 |
| $Ta_2O_5$ | 0-25 |
| $As_2O_3$ | 0-less than 1 |
| $SnO_2$ | 0-less than 1 |
| F | 0-less than 2 |

For example, the dielectric glass flux layer may comprise, in weight percent on an oxide basis:

TABLE 16

| | Dielectric Glass Flux no. | | |
|---|---|---|---|
| | 1 (wt.-%) | 2 (wt.-%) | 3 (wt.-%) |
| Components | | | |
| $SiO_2$ | 26.5 | 32.31 | 28.2 |
| $P_2O_5$ | | | |
| $K_2O$ | | 5.49 | 5.2 |
| $Na_2O$ | 11.1 | 9.47 | 9.6 |
| BaO | 17.7 | 8.8 | 13.4 |
| SrO | | | |
| CaO | | 1.97 | 0.85 |
| ZnO | | | |
| $TiO_2$ | 26.4 | 25.06 | 25.1 |
| $ZrO_2$ | | | |
| $Nb_2O_5$ | 18.3 | 16.85 | 17.5 |
| $B_2O_3$ | | 0.79 | |
| $Gd_2O_3$ | | | |
| $Sb_2O_3$ | | 0.02 | |
| $La_2O_3$ | | | |
| $GeO_2$ | | | |
| $Ta_2O_5$ | | | |
| $As_2O_3$ | | 0.012 | |
| Properties | | | |
| Softening temperature EW ($10^{7.6}$ dPas) | 716° C. | 688° C. | 683° C. |
| Coefficient of thermal expansion (CTE) $\alpha_{(20-300)}$ | $9.9*10^{-6}$/K | $9.9*10^{-6}$/K | $10.3*10^{-6}$/K |
| Density, g/cm$^3$ | 3.53 | 3.22 | 3.37 |
| Refractive index, $n_d$ | 1.85 | 1.78 | 1.80 |
| Dielectric constant, $\epsilon_r$ | 15.2 @ 1 GHz | 12.7 @ 1 GHz | 13.3 @ 1 GHz |
| Dielectric loss, tan δ | 0.0033 | 0.001 | 0.0019 |

Preferably, the article in all aspects of the invention may comprise a further layer, wherein the further layer is a metal layer. This further layer may be arranged between the substrate and the first layer, thus forming a base coat, or the further layer may be arranged on top of the first layer as a top coat. The further layer may be, in this case, configured to provide a safety circuit in case the article is used in a microwave oven, for example. Compositional ranges of suitable metal or metal alloy layers are listed in Table 5. Examples of metal or metal layers are listed in Table 6.

The further layer may also be configured to comprise a transparent conductive oxide described above.

Further, the article according to all aspects of the disclosure may also comprise several further layers.

In case a further layer is present, the layer comprising a glass or glass ceramic material may have a thickness of less than 4 mm.

Fourth Aspect

According to a fourth aspect of the disclosure, the article comprises a dielectric or non-dielectric substrate and a metal layer, wherein the metal layer preferably has a thickness between at least 5 nm and at most 50 nm. Preferably, the article comprises a further layer, the further layer comprising a transparent conductive oxide. In this aspect, desirable properties may be provided by the metal layer, so it is unnecessary for the substrate to have dielectric properties, in other words the substrate may have a dielectric constant, $\varepsilon_r$, of less than about 15 and/or a dielectric loss, tan δ, of more than about 0.0075.

In case the article comprises a metal layer, e.g. a metal layer as given in Table 6, the article may have in the portion of the article comprising the substrate and the layer, for layer thicknesses preferably ranging from about at least 5 nm to about at most 50 nm, preferably about at most 30 nm, an electrical resistivity, given in ohms/cm$^2$, of about at least 1 and at most 10,000, and/or a microwave leakage, given in mW/cm$^2$, of about less than 5, and/or a haze of about less than 150, and/or a transmittance of electromagnetic radiation in a wavelength range from 380 nm to 780 nm (that is, a light transmittance) of about at least 50% to about at most 85% for a thickness of the article and/or the substrate between about 3 mm and about 4 mm.

The electrical resistivity of the metal layer may be very high, that is, up to about 10,000 ohms/cm$^2$, taking into account that for very thin metal layers of about only 5 nm, for example, that may be coated on top of further layer, the metallic material is a porosity fill of voids formed at the surface of the further layer. This changes the bulk film resistivity of the surface. Further, protective chemistry of the metal layer, such as a passivation layer formed at the surface thereof, can even prevent measurement of the metal layer resistivity, thus resulting in the indicated very high resistivity value.

In the case when a TCO layer is present, the substrate comprises preferably a glass or glass ceramic material with a low CTE, that is, a CTE of less than $4*10^{-6}$/K. This is favourable as the transparent conductive oxide may be configured so as to rapidly heat upon exposure to microwave radiation, thereby heating the substrate as well. This rapid heating may result in breakage of the substrate. It is, however, possible to minimize glass or glass ceramic breakage due to rapid temperature by using low CTE substrate materials.

Preferably, the transparent conductive oxides comprise $SnO_2$. According to an embodiment, $SnO_2$ may be a main component of the transparent conductive oxide. According to a further embodiment, the TCO may comprises a doped $SnO_2$. A suitable compositional range of a transparent conductive oxide material comprising a doped $SnO_2$ is given in Table 7. Examples of suitable transparent conductive oxide materials comprising $SnO_2$ are given in Table 8.

Fifth Aspect

According to a fifth aspect, the article comprises a substrate, for example a non-dielectric substrate, and a layer, wherein the layer may comprise a transparent conductive oxide. In this aspect, desirable properties may be provided by the layer, so it is unnecessary for the substrate to have dielectric properties, in other words the substrate may have a dielectric constant, $\varepsilon_r$, of less than about 15 and/or a dielectric loss, tan $\delta$, of more than about 0.0075.

Further, in case the article comprises a layer comprising a transparent conductive oxide material, the article has in the portion comprising the substrate and the layer, for layer thicknesses ranging from about 100 nm to about at most 380 nm, an electrical resistivity, given in ohms/cm$^2$, of about at least 1 to about at most 1000, and/or a haze less than about 3, and/or a transmittance of electromagnetic radiation in a wavelength range from 380 nm to 780 nm (or light transmittance) of about at least 60 to about at most 85% for a thickness of the article and/or the substrate between about 3 mm and about 4 mm and/or a reflectance of electromagnetic radiation in a wavelength range from 1.5 μm to 10 μm of about at least 10% to at most about 90%, and/or a microwave leakage, of less than 80 mW/cm$^2$, preferably less than 50 mW/cm$^2$, more preferably less 10 mW/cm$^2$, and most preferably less than 5 mW/cm$^2$ The microwave leakage is preferably determined at a wattage of at least 800 watts. Further, the microwave leakage may preferably be achieved for substrate and/or article thicknesses between at least 1 mm and at most 8 mm.

Preferably, the transparent conductive oxide comprises $SnO_2$. $SnO_2$ is a preferred material, as it is readily available and can be applied as a layer (or coating) in well established, cost-sensitive processes.

In this case, the layer may be configured to comprise undoped $SnO_2$. Such an embodiment is preferred if a rapid heating of the layer and, thus, the substrate is to be achieved. However, in this case, preferably the substrate comprises a glass or glass ceramic material with a thermal expansion coefficient of less than $4*10^{-6}$/K, thereby providing thermal shock resistance.

However, it may be preferred, in order to achieve a reflectance of electromagnetic radiation in a wavelength range from 1.5 μm to 10 μm of about at least 10%, and/or a microwave leakage of less than 80 mW/cm$^2$, preferably less than 50 mW/cm$^2$, more preferably less 10 mW/cm$^2$, and most preferably less than 5 mW/cm$^2$, that the layer comprises doped $SnO_2$. In case the microwave leakage is to be lower, that is, a microwave leakage of less than 10 mW/cm$^2$, and preferably less than 5 mW/cm$^2$ is to be achieved, an embodiment wherein the layer comprises doped $SnO_2$ may be particularly preferred. The microwave leakage is preferably determined at a wattage of at least 800 watts. Further, the microwave leakage may preferably be achieved for substrate and/or article thicknesses between at least 1 mm and at most 8 mm.

Preferably, the transparent conductive oxides comprise $SnO_2$. According to an embodiment, $SnO_2$ may be a main component of the transparent conductive oxide. According to a further embodiment, the TCO may comprises a doped $SnO_2$. A suitable compositional range of a transparent conductive oxide material comprising a doped $SnO_2$ is given in Table 7. Examples of suitable transparent conductive oxide materials comprising $SnO_2$ are given in Table 8.

According to an embodiment of the disclosure, the substrate may comprise a soda-lime glass.

According to an embodiment, the layer is present and is a crystalline layer. Such an embodiment may be preferred if a high conductivity of the metal layer and/or the layer comprising a transparent conductive oxide, preferably $SnO_2$, is to be achieved. According to an embodiment, the layer may be nanocrystalline.

A further aspect of the present application is directed towards a household appliance, preferably a microwave oven, comprising a door comprising a pane-like article according to an embodiment of the present application.

According to a preferred embodiment, the door of the household appliance is devoid of a metal mesh, that is, the door is metal-mesh free.

According to a further embodiment, the door of the household appliance comprises a single pane-like article of the present disclosure.

EXAMPLES

The invention will now be explained further with reference to the following examples. For examples 1 to 15, the substrate thickness was 4 mm. As borosilicate glasses, borosilicate glasses with a low CTE are used, for example, borosilicate glasses that are available under trade names Borofloat® 33 or Borofloat® 40.

In examples no. 1 to 6 listed in the following two tables, a first or base layer, that is, a layer sandwiched between the substrate and a further layer, was applied onto one of the principal surfaces of a substrate. That first or base layer was a layer comprising a TCO material. As second layer, a metal layer was applied in some examples on top of the base or first layer.

TABLE 17

| Example no. | 1 | 2 | 3 | 4 |
|---|---|---|---|---|
| Substrate | Soda-lime glass | Borosilicate glass | Soda-lime glass | Glass ceramic |
| First layer | | | | |
| Material | TCO | TCO | TCO | TCO |
| Composition | $SnO_2$:F (Table 8, no. 1) | $SnO_2$:Ni (Table 8, no. 2) | $SnO_2$:Sb (Table 8, no. 3) | $SnO_2$:Sb (Table 8, no. 3) |
| Thickness | 300 nm | 300 nm | 300 nm | 300 nm |
| Second layer | | | | |
| Material | Metal | Metal | Metal | |
| Composition | Ni10Cr88C2 (Table 6, no.1) | Cr98C0.5Fe1.5 (Table 6, no.4) | Ni90Cr2C0.5Cu7+ (Table 6, no 3) | |
| Thickness | 7 nm | 15 nm | 50 nm | |
| Properties | | | | |
| IR reflection (1.5-10 μm), % | More than 30 | More than 30 | More than 30 | More than 30 |
| Light transmittance (380-780 nm), % | 81 | 63 | 56 | More than 60 |
| Haze | 0.6 | 0.6 | 0.6 | More than 0.5 and less than 3 |
| Microwave leakage, mW/cm$^2$ | Less than 5 | Less than 5 | Less than 5 | Less than 5 |

TABLE 18

| Example no. | 5 | 6 |
|---|---|---|
| Substrate | Borosilicate glass | Soda-lime glass |
| First layer | | |
| Material | TCO | TCO |
| Composition | $SnO_2$:F (Table 8, no. 1) | $SnO_2$:F (Table 8, no. 1) |
| Thickness | 300 nm | 300 nm |
| Second layer | | |
| Glass Flux | | Table 10, no.1 |
| Glass particle | | Table 12, no. 1 |
| Thickness | | 60 μm |
| Properties | | |
| IR reflection (1.5-10 μm), % | More than 30 | More than 30 |
| Light transmittance (380-780 nm), % | More than 80 | 39 |

TABLE 18-continued

| Example no. | 5 | 6 |
|---|---|---|
| Haze | 0.6 | 101 |
| Microwave leakage, mW/cm$^2$ | Less than 5 | Less than 5 |

Here, example 6 is an example of an article according to the second aspect of the present application, that is, an article comprising a layer comprising a dielectric glass or glass ceramic material, here in the form of dielectric particles, embedded in a non-dielectric glass flux layer, as well as a further layer, that is, a TCO layer. Therefore, even though the layer thickness of the layer comprising a glass or glass ceramic material is be lower than 4 mm, for example, in the range from 5 μm-70 μm, the article still has a very low microwave leakage as indicated in table 18.

Examples no. 7 to 13 relate to embodiments of pane-like glass articles comprising a glass layer.

TABLE 19

| Example no. | 7 | 8 | 9 | 10 | 11 |
|---|---|---|---|---|---|
| Substrate | Soda-lime glass | Soda-lime glass | Soda-lime glass | Soda-lime glass | Soda-lime glass |
| Layer | Glass layer | Glass layer | Glass layer | Glass layer | Glass layer |
| Glass flux | Table 10, no. 1 | Table 10, no. 2 | Table 10, no. 3 | Table 10, no. 4 | Table 10, no. 5 |
| Glass particles | Table 13, no. 1 | Table 13, no. 2 | Table 13, no. 4 | Table 13, no. 3 | Table 13, no. 2 |
| Thickness | >4 mm | >4 mm | >4 mm | >4 mm | >4 mm |
| Properties | | | | | |
| IR reflection (1.5-10 μm), % | | | | | |
| Light transmittance (380-780 nm), % | 42 | 82 | 82 | More than 45 | More than 45 |
| Haze | 101 | 33 | 33 | 87 | 84 |
| Microwave leakage, mW/cm$^2$ | Less than 5 | Less than 5 | Less than 5 | Less than 5 | Less than 5 |

TABLE 19-continued

| Example no. | 12 | 13 |
|---|---|---|
| Substrate | Borosilicate glass | Borosilicate glass |
| Layer | Glass layer | Glass layer |
| Glass flux | Table 16, no. 1 | Table 16, no. 2 |
| Glass particles | | |
| thickness | >4 mm | >4 mm |
| Properties | | |
| IR reflection (1.5-10 μm), % | | |
| Light transmittance (380-780 nm), % | 85 | 82 |
| Haze | 4.8 | 5 |
| Microwave leakage, mW/cm$^2$ | Less than 5 | Less than 5 |

Example numbers 14 and 15 relates to a pane-like article comprising a dielectric glass as a substrate material.

TABLE 20

| Example no. | 14 | 15 |
|---|---|---|
| Substrate | Dielectric glass 1, Table 2 | Dielectric glass 2, Table 2 |
| Layer | None | None |
| Properties | | |
| IR reflection (1.5-10 μm), % | | |
| Light transmittance (380-780 nm), % | More than 80 | More than 80 |
| Haze | Less than 1.8 | Less than 1.8 |
| Microwave leakage, mW/cm$^2$ | Less than 5 | Less than 5 |

It can be shown that in case of dielectric glass or glass ceramic layers according to the second and third aspect of this application, it is necessary to either apply a further layer, such as a metal layer or a TCO layer or to have high layer thicknesses of more than 4 mm.

In the following table, counterexamples of articles with layers comprising dielectric glass or glass ceramic materials as single layers, but with layer thicknesses of less than 4 mm, are shown. As can be seen from the data in this table, these articles do not meet the microwave leakage criteria, underlining the importance of the 4 mm thickness requirement in case of single layers comprising glass or glass ceramic materials.

TABLE 21

| | Counterexample no. | | | | |
|---|---|---|---|---|---|
| | 1 | 2 | 3 | 4 | 5 |
| Substrate | Soda-lime glass | Soda-lime glass | Soda-lime glass | Soda-lime glass | Soda-lime glass |
| Layer | Glass layer | Glass layer | Glass layer | Glass layer | Glass layer |
| Glass flux | Table 10, no. 1 | Table 10, no. 2 | Table 10, no. 3 | Table 10, no. 4 | Table 10, no. 5 |
| Glass particles | Table 13, no. 1 | Table 13, no. 1 | Table 13, no. 2 | Table 13, no. 2 | Table 13, no. 2 |
| Thickness | 10 μm | 13 μm | 16 μm | 21 μm | 18 μm |
| Properties | | | | | |
| IR reflection (1.5-10 μm), % | | | | | |
| Light transmittance (380-780 nm), % | | | | | |
| Haze | About 71 | About 80 | 84 | About 94 | About 87.5 |
| Microwave leakage, mW/cm$^2$ | More than 80 | More than 80 | More than 80 | More than 80 | More than 80 |

DESCRIPTION OF DRAWINGS

The invention will now be further explained with reference to the following drawings. In the drawing, like reference numerals refer to like or corresponding elements.

DETAILED DESCRIPTION

Figure 1:
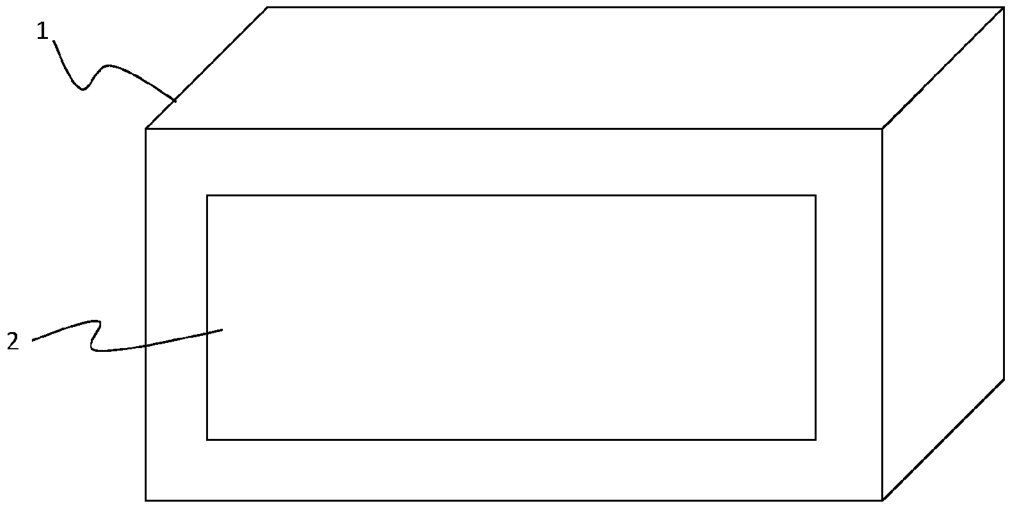
FIG. 1 is a schematic and not drawn to scale depiction of a household appliance.

FIG. 1 shows in a schematic and not to scale depiction a household appliance 1. The household appliance 1 has a front side comprising a door comprising a pane-like article 2 according to embodiments of the present disclosure.

Figure 2:
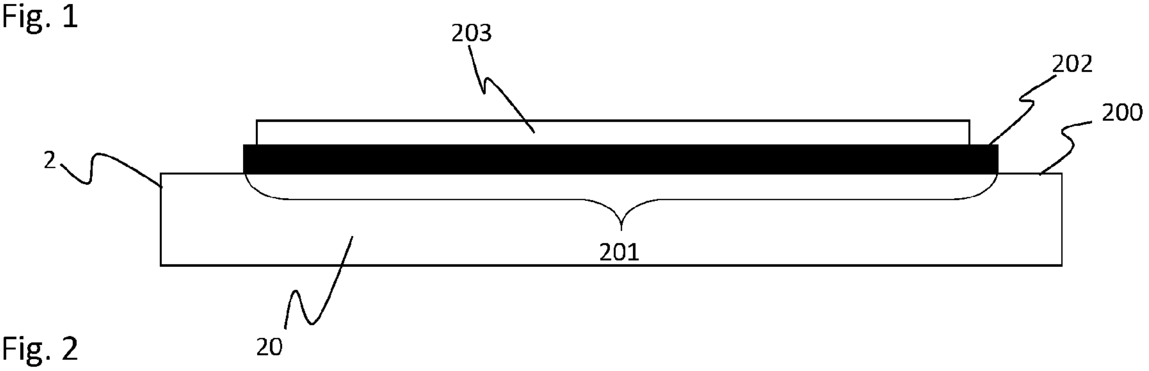
FIGS. 2 and 3 are schematic and not drawn to scale depictions of pane-like articles.
Figure 3:
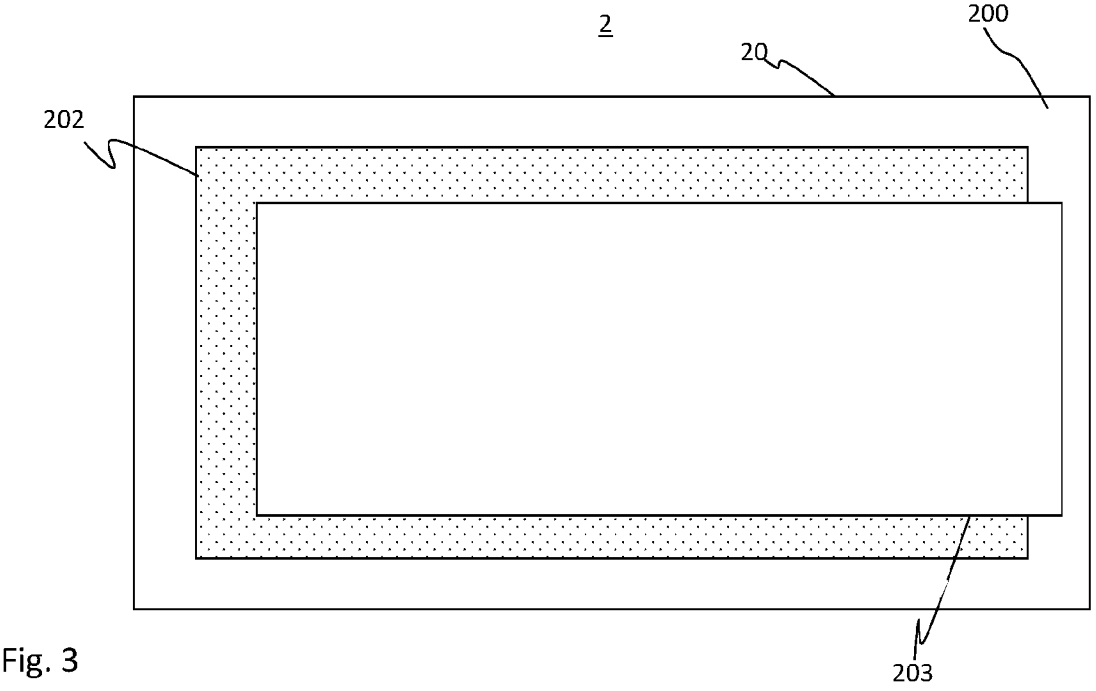

FIG. 2 is a schematic and not to scale depiction of a pane-like article 2 according to an embodiment of the invention in a side view. The pane-like article 2 comprises a substrate 20 comprising in a portion 201 of principal surface 200 a first layer 202 applied, in this case, directly onto the substrate material. Further, the pane-like article 2 comprises a further layer 203 applied, in this case, on top of the first layer 201. The further layer 203 may be applied so as to completely cover the first (or base) layer 202, or, as schematically depicted in FIG. 3, may be applied so that if covers only parts of the first layer 202 and may, at least in a portion thereof, even be applied directly upon the substrate material.

Preferably, in case the article 1 comprises two layers, the base layer 202 may be a layer comprising a TCO materials according to embodiments of the present disclosure, and the further layer 203 may be a metal layer according to embodiments of the present disclosure.

However, according to the disclosure, it is possible that the article comprises only one layer 202. In that case, the layer 202 preferably is a glass layer. The layer 202 may in that case comprises a glass flux material only, or the layer may comprise a glass flux as well as glass particles.

Further, according to an embodiment, the article may be layer free. In that case, the substrate material may comprise a glass material that imparts a reflectance of electromagnetic radiation in a wavelength range from 1.5 μm to 10 μm of about at least 10%, and/or a microwave leakage of less than 80 mW/cm$^2$, preferably less than 50 mW/cm$^2$, more preferably less 10 mW/cm$^2$, and most preferably less than 5 mW/cm$^2$ to the pane-like article. The microwave leakage is preferably determined at a wattage of at least 800 watts. Further, the microwave leakage may preferably be achieved for substrate and/or article thicknesses between at least 1 mm and at most 8 mm. For example a suitable glass material is listed in Tables 1 to 4 and 16.

Figure 4:
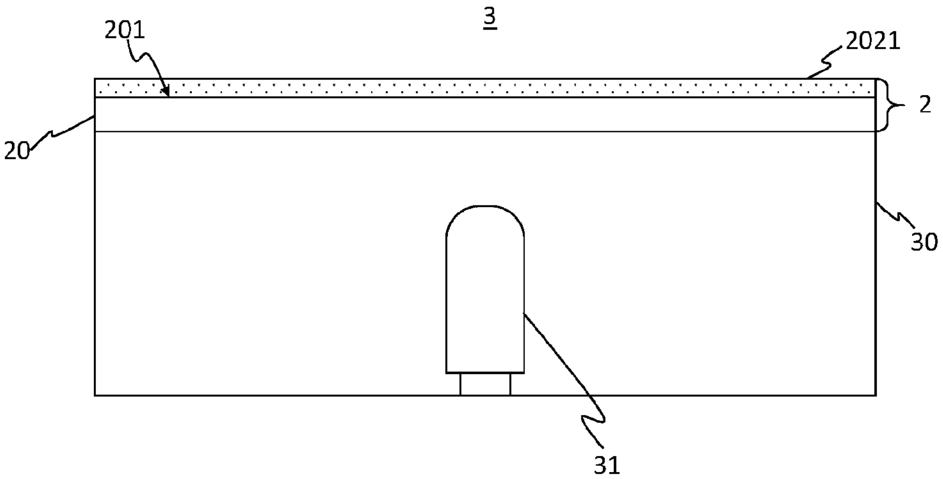
FIG. 4 is a schematic and not drawn to scale depiction of a pane-like article for use as a cover glass for an LED device.

FIG. 4 depicts schematically and not drawn to scale LED device 3 comprising housing 30 and LED 31. As part of housing 30, pane-like article 2 according to an embodiment may be used, for example as protective cover. For example, in that case pane-like article 2 may be configured to have a translucent, glass-based layer, preferably a layer according to the second aspect of the present invention, that is, a glass flux layer. In the schematic and not drawn to scale depiction in FIG. 4, pane-like article 2 comprises a first layer arranged on principal surface 201, wherein, in the case depicted in FIG. 4, the first layer is a glass flux first layer 2021. For example, in the special embodiment of FIG. 4, it may be contemplated that layer 2021 is a translucent layer with a haze of up to 150. The microwave leakage of layer 2021 may in that case be less than 80 mW/cm$^2$, preferably less than 50 mW/cm$^2$ and lower still, however, in the case depicted in FIG. 4, a very low microwave leakage need not be achieved. Rather, microwave leakage is set to be low enough so that LED functionality is not affected during 5 minutes with microwave power set to 900 watts. Further, it may be preferred that the coating is a hazy, translucent coating, so that the pane-like article may also act as an anti-dazzle filter.

The invention claimed is:

1. A pane-like article comprising a pane-like substrate,
wherein the substrate comprises a glass or a glass ceramic material,
wherein in a portion of the pane-like article,
the pane-like article has a reflectance of electromagnetic radiation in a wavelength range from 1.5 μm to 10 μm of about at least 10%, and
a microwave leakage of less than 80 mW/cm$^2$, preferably less than 50 mW/cm$^2$, more preferably less 10 mW/cm$^2$, and most preferably less than 5 mW/cm$^2$.

2. The article according to claim 1, wherein in said portion of the pane-like article, the pane-like article has a transmittance of electromagnetic radiation in a wavelength range from 380 nm to 780 nm of about at least 10% for a thickness of the article and/or the substrate between about 3 mm and about 4 mm.

3. The article according to claim 1, wherein in said portion of the pane-like article, the pane-like article has an electrical resistivity of less than 50 ohms/cm$^2$, preferably of less than 30 ohms/cm$^2$.

4. The article according to claim 1, wherein in said portion of the pane-like article, the pane-like article has a thermal stability of at least 450° C.

5. The article according to claim 1, wherein in said portion of the pane-like article, the pane-like article has a dielectric constant $\varepsilon_r$ of greater than 15 at a frequency of 1 GHz.

6. The article according to claim 1, wherein in said portion of the pane-like article, the pane-like article has a dielectric loss, tan δ, of less than 0.0075 at a frequency of 1 GHz and preferably about at least 0.0024 and about at most 0.0075.

7. The article according to claim 1, comprising a layer in said portion of said pane-like article, wherein the layer is a contiguous layer.

8. The article according to claim 1, wherein the substrate comprises a glass or glass ceramic material having a dielectric constant $\varepsilon_r$ of greater than 15 at a frequency of 1 GHz and/or a dielectric loss, tan δ, of less than 0.0075 and preferably about at least 0.0024 and about at most 0.0075 at a frequency of 1 GHz.

9. The article according to claim 8, wherein the article comprises a layer arranged on at least one of the principal surface of the pane-like substrate at least partially so that the layer covers one of the principal surfaces of the substrate at least in a portion thereof, and wherein the layer is a metal layer, wherein preferably the thickness of the layer is between 5 nm and 50 nm.

10. The article according to claim 8, wherein the layer comprises a transparent conductive oxide.

11. The article according to claim 9, comprising a further layer, wherein said further layer comprises a transparent conductive oxide.

12. The article according to claim 1, wherein the article comprises a layer arranged on at least one of the principal surface of the pane-like substrate at least partially so that the layer covers one of the principal surfaces of the substrate at least in a portion thereof, and wherein the layer comprises a glass or glass ceramic material having a dielectric constant $\varepsilon_r$ of greater than 15 at a frequency of 1 GHz and/or a dielectric loss, tan δ, of less than 0.0075 and preferably about at least 0.0024 and about at most 0.0075 at a frequency of 1 GHz.

13. The article according to claim 12, wherein the layer comprises a non-dielectric flux and dielectric particles.

14. The article according to claim 12, wherein the layer comprises a dielectric flux and non-dielectric particles.

15. The article according to claim 12, wherein the article comprises a further layer, wherein said further layer is a metal layer.

16. The article according to claim 12, wherein the article comprises a further layer, wherein said further layer comprises a transparent conductive oxide.

17. The article according to claim 1, wherein the article comprises a layer arranged on at least one of the principal surface of the pane-like substrate at least partially so that the layer covers one of the principal surfaces of the substrate at least in a portion thereof, and wherein the layer is a metal layer and wherein the article has a dielectric constant, $\varepsilon_r$, of greater than about 15 and preferably less than about 910, preferably about at least 15 and below about 150, at a frequency of 1 GHz and/or a dielectric loss, tan δ, of less than about 0.0075 and preferably more than about 0.0024 and less than about 0.0075 at a frequency of 1 GHz.

18. The article according to claim 17, wherein the metal layer comprises nickel and/or chromium.

19. The article according to claim 17, wherein the layer has a thickness between at least 5 nm and at most 50 nm.

20. The article according to claim 17, wherein the article comprises a further layer, said further layer comprising a transparent conductive oxide.

21. The article according to claim 17, wherein the substrate comprises a glass and/or glass ceramic material with a CTE of less than $4*10^{-6}$/K.

22. The article according to claim 1, wherein the article comprises a layer arranged on at least one of the principal surface of the pane-like substrate at least partially so that the layer covers one of the principal surfaces of the substrate at least in a portion thereof, and wherein the layer comprises a transparent conductive oxide, and wherein the article has a dielectric constant, $\varepsilon_r$, of greater than about 15 and preferably less than about 910, preferably about at least 15 and below about 150, at a frequency of 1 GHz and/or a dielectric loss, tan δ, of less than about 0.0075 and preferably more than about 0.0024 and less than about 0.0075 at a frequency of 1 GHz.

23. The article according to claim 22, wherein the transparent conductive oxide comprises $SnO_2$.

24. The article according to claim 23, wherein the transparent conductive oxide comprises an undoped $SnO_2$ and wherein the substrate comprises a glass or glass ceramic material with a thermal expansion coefficient of less than $4*10^{-6}$/K.

25. The article according to claim 23, wherein the $SnO_2$ is a doped $SnO_2$.

26. The article according to claim 25, wherein the dopant comprises Cu, Sb, Ni, or F, or mixtures thereof.

27. The article according to claim 25, wherein the layer comprises a copper-doped $SnO_2$.

28. A household appliance, preferably a microwave oven, comprising a door comprising a pane-like article according to claim 1.

29. The household appliance according to claim 28, wherein the door is metal mesh free.

30. Use of the article according to claim 1 as electromagnetic shielding or as cover glass for LED.

* * * * *